END CUSHIONED PAPERBOARD CONTAINER

Original Filed Sept. 28, 1960 2 Sheets-Sheet 1

INVENTOR:
ARWED C. BOITEL

BY John Buckingham

ATTORNEYS.

END CUSHIONED PAPERBOARD CONTAINER

Original Filed Sept. 28, 1960 2 Sheets-Sheet 2

INVENTOR
ARWED C. BOITEL

BY John W. Duckworth
ATTORNEYS.

United States Patent Office

Re. 25,856

Reissued Sept. 14, 1965

25,856

END CUSHIONED PAPERBOARD CONTAINER

Arwed C. Boitel, Evanston, Ill., assignor to Alton Box Board Company, a corporation of Delaware Original No. 3,094,267, dated June 18, 1963, Ser. No. 59,041, Sept. 28, 1960. Application for reissue Apr. 17, 1964, Ser. No. 373,120

9 Claims. (Cl. 229—40)

Matter enclosed in heavy brackets [ ] appears in the original patent but forms no part of this reissue specification; matter printed in italics indicates the additions made by reissue.

This invention relates to paperboard containers, and more particularly to corrugated paperboard wrappers for packaging books, phonograph records and similar items requiring cushioning protection at the corners or ends of the package.

With the advent of book clubs, record album clubs and the like, a problem has arisen in providing adequate packaging for mail shipment. The volume is such that automatic packaging machinery is desirable, if not essential. Heretofore, the problem has been resolved by utilizing an uncushioned wrapper formed from corrugated paperboard. The wrapper is formed with integrally connected bottom, end and cover panels, the bottom and cover panels having associated side panels. Corner flaps extending from the bottom side panels are then secured against outward displacement by engagement with the cover side panels, which fit within the bottom side panels. This particular wrapper is shipped flat for set up with automatic machinery by a procedure which involves placing the article on the bottom panel and then pushing the article and wrapper through a folder, which folds the corner flaps, side and end panels. The cover panels are folded over and sealed as a final step. The wrapper provides corner protection in the sense that the corners are reinforced with several thicknesses of paperboard, and the corrugations of the board also provides some cushioning effect.

A demand exists, however, for a wrapper which affords additional cushioning protection for the contents, especially at the corners and ends of the package, the wrapper being of a character such that it may be readily set up on machinery as well as by hand. Briefly, this need is herein met by providing a corrugated paperboard wrapper blank, which is wrapped about an article as a tube, but the end walls thereof are set back within the ends of the tube. An elongate generally rectangular sheet is scored to define the four main panels for the sides, top and bottom of the package plus an end flap which is adapted to overlap with the opposite end of the blank to complete a tube. The blank is further formed with *opposite* longitudinal margins which fold in, and [become] *may be* glued to the main panels, thereby to provide inner end walls or edges set back relative to the outer ends of the wrapper. The *opposite* inturned margins are of uniform width, but unglued extensions project inwardly therefrom, thereby to provide for end walls and end-wall retaining flaps extending from the end walls *which locate the corners of the packed book substantially inward of the extremities of the package.*

The set up operation could involve placing the wrapper so the inturned margins face upwardly, folding the end-wall extensions upwardly, placing the article to be contained upon the panel between the end-wall extensions, folding the end-wall retaining flaps down upon the article, and thereafter folding the main panels about the article to complete a tube-like wrapper with in-set end walls. Outward displacement of the end panels is resisted by engagement with the inner edges of the inturned margins, and if the wrapper is shaped to have a close fit with the contained article, inward displacement of the end walls would be resisted by the contained article. The end-wall retaining flaps [would normally] *may, if desired,* be glued to the *main* panel which is swung over these flaps by applying glue to the flaps during the set up operation, although this may not be necessary in small packages. The inturned margins may be pre-glued and pre-folded, or they may be glued during the set-up operation. The end flap of the blank may be glued down on the outside or tucked inside and the wrapper ends then secured by an adhesive tape to complete the package.

Several opening systems are contemplated. In one instance, the end flap is secured by a releasable glue connection, such as might be achieved by spot pasting or spot overprinting. In an alternative embodiment, a tear strip extends the length of the blank across the bottom, side and cover panels, so that the wrapper can be readily torn into two sections which have a releasing telescoping cooperation with the contained item. When a tear strip is utilized, the corrugations should extend transversely thereof. If the end flap is tucked inside and the ends of the wrapper secured by a tape, the tape is slit to open the package.

In cutting the blanks, an economical internesting effect is achieved when the end wall sections are located opposite the top panel. This introduces a slight complication in the set up, since the top panel becomes the bottom panel on which the article is placed during set up, the end flap then being folded under the "top" panel. This complication is avoided, however, by locating the end wall sections opposite the bottom panel.

Other features of the invention will be in part apparent from and in part pointed out in the following detail description taken in connection with the accompanying drawings, in which.

Figure 1:
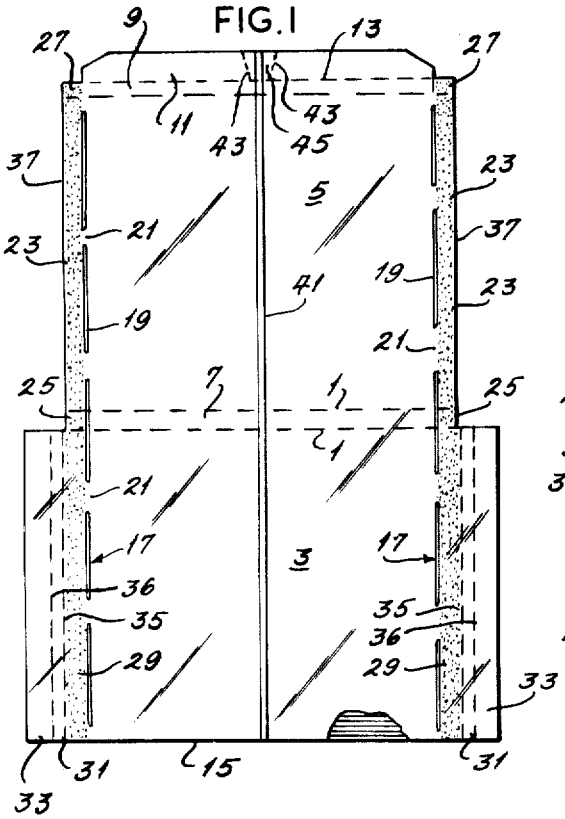
FIG. 1 is a plan view of a sheet of corrugated paperboard, which has been cut and scored in accordance with this invention, certain glue areas being indicated by stippling.

Referring to the drawings, there is shown, *as an illustrative embodiment of the invention,* an elongate sheet of corrugated paperboard with the corrugations extending transversely of the sheet. The sheet is scored or cut along transverse fold lines 1 to define a pair of large panels 3 and 5 and a pair of narrow panels 7 and 9. The panels 3 and 5 ultimately become the bottom and top or cover walls of the package, whereas the narrow panels 7 and 9 become the side walls of the package. In addition, there is a narrow end flap 11 defined by spaced slots or fold lines 13, the panel 11 projecting from the panel 9 as a second cover panel or end flap for completing the package. It will be understood the end flap 11 is brought into overlying relationship with the opposite end margin 15 of the blank in setting up this wrapper.

The ends of the panels 3, 5, 7 and 9 have fold lines 17 extending along opposite longitudinal margins of the sheet. The fold lines 17 are formed by spaced elongate slots 19 with relatively short uncut connecting portions 21. The marginal portions of the sheet lying outwardly of fold lines 17 are folded in and glued, the panels 5, 7 and 9 thereby having associated marginal portions 23, 25 and 27, respectively, of a relatively narrow uniform width, the width being from one half to one inch, for example. [*The*] *At the opposite* ends of the panel 3 [have] *there are end portions or flaps beyond fold lines 17. Such end portions or flaps include: a first sub-panel 29 delineated by fold lines 17 and 37; a second sub-panel 31 delineated by fold lines 35 and 36; and a third sub-panel 33 between fold line 36 and the edge of the blank* [marginal portions 29, which may be of slightly greater width and which further have extensions 31 and 33 defined by fold lines 35 and 36]. The fold lines 35 and 36 may be defined by relatively short spaced cuts. The *sub-panels or* sections 31 ultimately become the end walls of the package, whereas the flaps *or sub-panels* 33 act as end wall retainers.

It will be noted that the marginal portions 23, 25, 27 and 29 are coated with adhesive (FIG. 1) and are folded over (FIG. 2) and glued down upon the panels 5, 7, 9 and 3, respectively, thereby to form a continuous inset edge extending substantially the length of the blank. The portions 27 terminate short of the fold line 13, as indicated.

Figure 2:
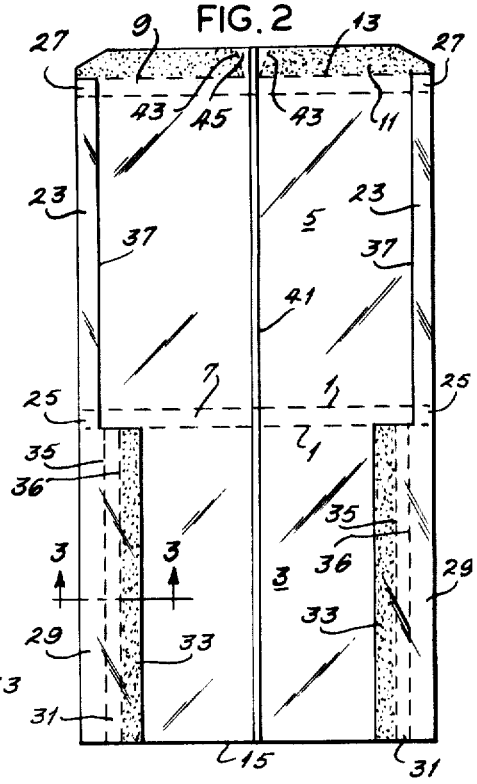
FIG. 2 is a view similar to FIG. 1 showing the margins folded to form hem portions.

In preparing a blank, it will be understood that the size and shape thereof is correlated with the article to be packaged. In many conventional packages, the main panels are of a shape and size substantially equal to the dimensions of the contained article, but in the present wrapper, the main panels are of greater width, depending upon the amount of cushioning protection desired. Referring to FIG. 2, the space between the *opposite* [inset edges 37 (and] fold lines 35 [)] *cannot be less than and* should correspond to [the] *one* dimension[s] of the contained item, *while the space between opposite inset edges 37 is at least two thicknesses of blank material greater than the same dimension of the contained item, and the distance between opposite fold lines 17 is greater than the corresponding dimension of the contained item by at least twice the distance between fold lines 17 and their adjacent lines 35.*

Figure 3:
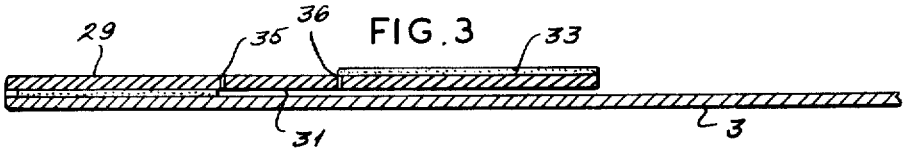
FIG. 3 is a cross section taken generally on the line 3—3 of FIG. 2.
Figure 4:
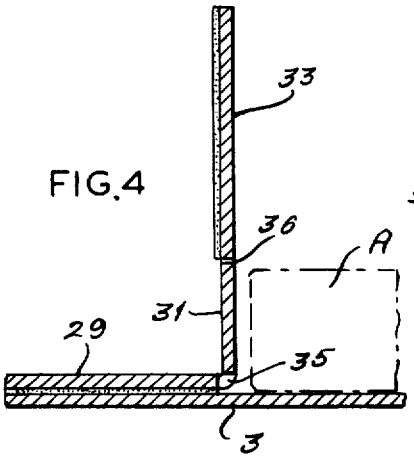
FIG. 4 is a view similar to FIG. 3 illustrating an initial step in setting up the wrapper.
Figure 5:
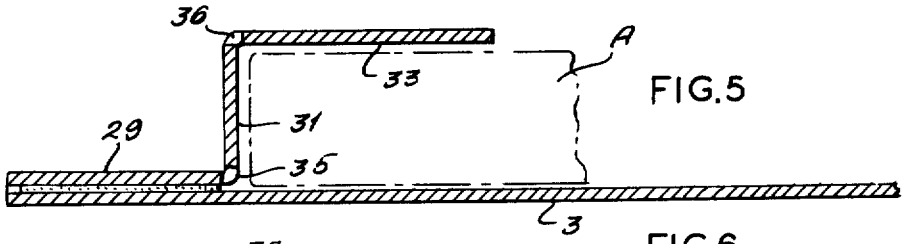
FIG. 5 is a view similar to FIG. 4 illustrating a next step in the setting up operation.

The package may be set up manually or by automatic machinery. For example, a blank is arranged with the inturned margins facing [upwardly] *inwardly,* as indicated in FIGS. 2 and 3. The end wall sections 31 are then folded up (*as shown in FIG. 4*) and an article A (*such as a book*) to be packaged therein is placed upon the panel 3 (FIG. 4). The end wall retaining flaps 33 are folded down over the article (FIG. 5). The side panel 7 is folded upwardly, the main panel 5 is folded over the article into glued relationship with the upper surfaces of the end wall retaining flaps 33 (*as shown in FIG. 6*), the side panel 9 is folded downwardly, and the end flap 11 is secured at the end margin 15 of the panel 3.

Figure 6:
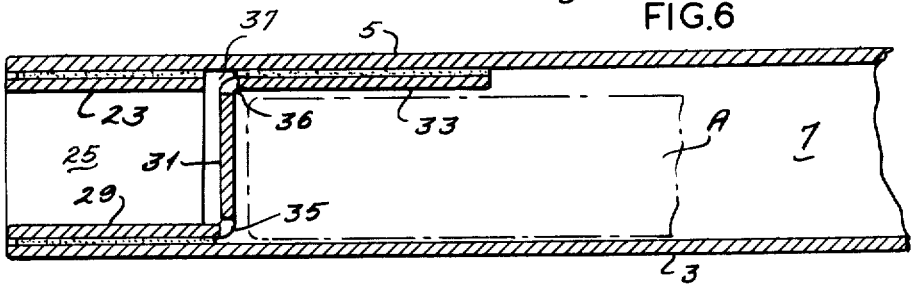
FIG. 6 is a view similar to FIG. 5 after folding the cover panel over the article.
Figure 7:
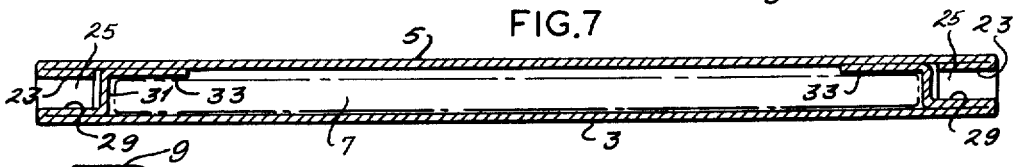
FIG. 7 is a cross section of the completed package taken on the line 7—7 of FIG. 9.
Figure 8:
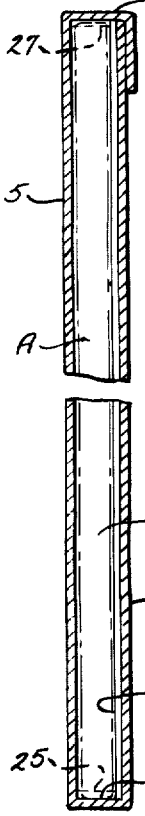
FIG. 8 is a cross section taken on the line 8—8 of FIG. 9.
Figure 9:
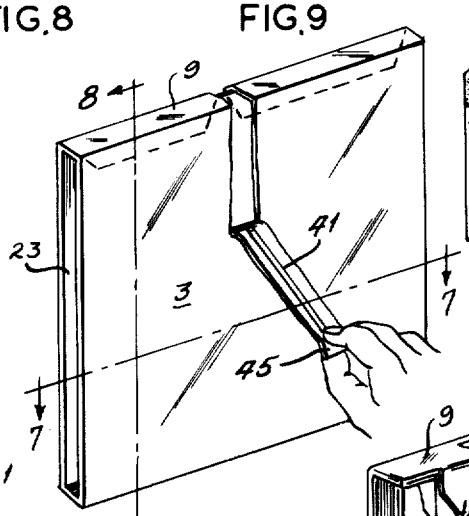
FIG. 9 is a perspective view illustrating how the package is opened.

*When the several panels are folded into the position shown in FIGURES 6, 7 and 8, the marginal portions 25 lie between side wall 7 and the adjacent ends of the respective marginal portions 29; and marginal portions 27 lie between side wall 9 and the other ends of the respective marginal portions 29. From FIGS. 1 and 2, it is apparent that, as stated above, marginal portions 23, 25 and 27 are of less width (horizontally as shown in FIGS. 1 and 2) than marginal portions 29. Consequently, when the parts reach their final (FIGS. 6, 7 and 8) position, portions 25 and 27 extend less far inward from fold lines 17 and 19 than do marginal portions 29. The extent of this is determined by the degree of disalignment between fold lines 35 and edges 37 (at the same side of the wrapper).*

The wrapper may be supplied to the user with the margins pre-folded and pre-glued, the adhesive therefor being shown in FIG. 1. The adhesive shown in FIG. 2 is then applied during the set-up operation. Alternatively, the wrapper may be supplied without pre-folding and glueing, in which event, the margins are coated and folded as part of the set-up operation.

The end flap 11 is shown secured with adhesive to the outer surface of panel 3 and the end wall retainer flaps 33 are adhesively secured to the inner surfaces of panel 5. This is readily accomplished by causing the blank to move by paste-applying rollers during the set-up operation, the adhesive being applied to the end wall retaining flaps 33 (or to the margins of panel 5) at any suitable stage in the operation prior to folding over of the panel 5 and preferably prior to folding down the end flaps 33 over the article.

The embodiment disclosed in FIGS. 1–9 further incorporates a tear strip 41 extending the length of the blank transversely of the corrugations, and cuts 43 are made in the glue flap 11 on opposite sides of the tear strip. The portion 45 of the glue flap between the cuts 43 is coated with a material which prevents an adhesive attachment, so as to act as a tongue which can be readily peeled back to facilitate stripping of the tear strip and opening the container. The tear strip causes the wrapper to be divided into two sections, which telescope from the contained article.

Figure 10:
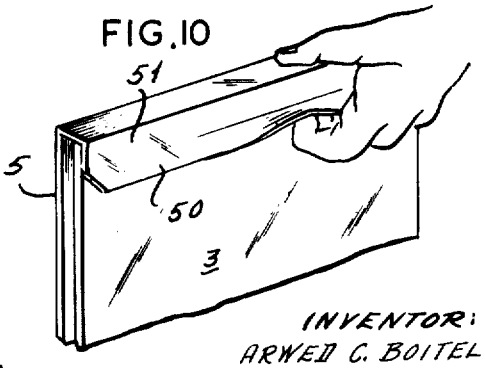
FIG. 10 is a perspective view of an alternative embodiment of the invention, wherein the wrapper is opened without a tear strip.
Figure 11:
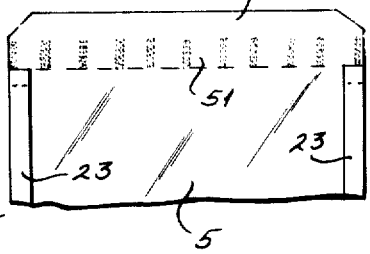
FIG. 11 is a detail plan view similar to FIG. 2, but showing the glue pattern at the end of the FIG. 10 blank.

Referring to FIGS. 10–11, an alternative opening system is disclosed. In this instance, no tear strip is utilized and a relatively wide tongue portion 50 projects beyond glued flap 51. The flap 51 is secured by spot pasting so that it can be readily peeled back for opening of the wrapper. Instead of a spot pasting condition, the flap might be spot printed with a coating which reduces the strength of the adhesive connection between the flap 51 and the underlying panel.

Figure 12:
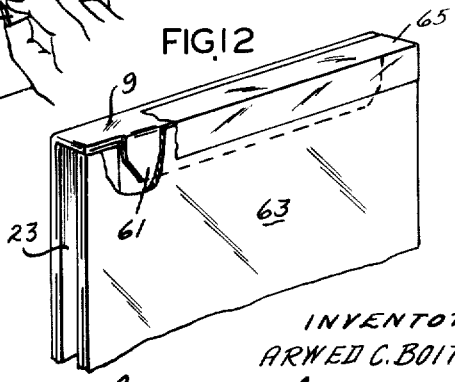
FIG. 12 is a view similar to FIG. 10 illustrating another embodiment of the invention.

FIG. 12 illustrates another way of securing the ends of the wrapper to form a tube. In this instance, an end flap 61 is tucked with top panel 63 and a strip of paper 65 adhesively secured to extend about the corner form by panels 61 and 67 where the ends of the wrapper meet.

It will be apparent that the wrapper should be made of fairly thick board, preferably corrugated board, when the end walls are held by the edges of the hem portions, and the width of the side panels 7 and 9 is slightly greater than the width of the end wall panels 31, the difference being determined by the thickness of the paperboard.

Changes in and modifications of the construction described may be made without departing from the spirit of my invention or sacrificing its advantages. For example, the panels 23, 25 and 27 might be omitted, or in very thin packages for one or two phonograph records, the panels 31 and 33 may also be omitted, leaving panels 29 with or without panels 23.

Having thus described the invention, what is claimed and desired to be secured by Letters Patent is:

1. A corner-protecting package for books and articles of like shape comprising a sheet of foldable board having top, bottom and side panels foldably connected to form an article-encompassing sleeve of length greater than the article, the bottom panel and at least one side panel having foldably connected marginal portions at both ends folded back within the sleeve, the infolded bottom-panel margins only having foldably-connected end-wall sections folded at right angles to the bottom panel, and the end-wall sections having retainer sections folded flat against the interior of the top panel, and the end-wall [section] *sections* having cut side edges extending along the interior surfaces of the side panels inwardly of the inner edge of said inwardly folded side panel margins.

2. A corner-protecting package for books and articles of like shape comprising a sheet of foldable board having bottom, side, top, side and glue panels foldably connected in that order to form an article-encompassing sleeve of length greater than the article, the width of the top and bottom panels being greater than that of the side panels, the bottom panel having foldably connected marginal portions at each end folded back within the sleeve, the infolded bottom-panel margins having foldably-connected end-wall sections folded at right angles to the bottom panel, and the end-wall sections having retainer sections folded flat against the interior of the top panel, said end-wall [section] *sections* having cut side edges extending along the interior surfaces of the [side] *bottom and top* panels.

3. A corner-protecting package for books and articles of like shape comprising a sheet of foldable board having top, bottom and side panels foldably connected to form an article-encompassing sleeve of length greater than the article, width of the top and bottom panels being greater than that of the side panels, the bottom panel having foldably connected marginal portions at each end folded back within the sleeve, the infolded bottom-panel margins having foldably-connected end-wall sections folded at right angles to the bottom panel, and the end-wall sections having retainer sections folded flat against the interior of the top panel, one of the sleeve-forming panels having a glue flap extending over another panel and running the length of the sleeve, and a tear strip formed on one of the sleeve-forming panels to extend across the package, thereby to facilitate opening of the package by splitting said panel.

4. A corner-protecting package for books and articles of like shape comprising a sheet of foldable board having top, bottom and side panels foldably connected to form an article-encompassing sleeve of length greater than the article, the width of the top and bottom panels being greater than that of the side panels, the bottom panel having foldably connected marginal portions at each end folded back within the sleeve, the infolded bottom-panel margins having foldably-connected end-wall sections folded at right angles to the bottom panel, and the end-wall sections having retainer sections folded flat against the interior of the top panel, one of the sleeve-forming panels having a glue flap extending over and spot glued to another panel, said glue flap having an unsecured tab extending over said other sleeve-forming panel, thereby to facilitate opening of the package by detachment of the glue flap.

*5. A flat wrapper for an article such as a book comprising a paperboard blank scored to define a top panel, a bottom panel, and side panels, each panel being foldably connected to at least one other panel, said bottom panel having two end portions respectively foldably connected thereto at parallel fold lines spaced from each other a distance substantially greater than the maximum dimension of said article, said end portions each being folded back 180° at said fold line to provide a double thickness for a substantial distance away from said fold line, said substantial distance at each end being not more than about one-half of the difference between the distance separating said fold lines and the maximum dimension of said article, said end portions each having:*

*(a) a second fold line parallel with the first-mentioned fold line and spaced therefrom said substantial distance;*

*(b) a third fold line parallel with said second fold line and spaced thereform a distance corresponding substantially to the width of said side panels minus twice the thickness of said paperboard;*

*(c) a section projecting beyond said third fold line for a distance approximately the same as said substantial distance.*

*6. A package comprising, an article such as a book or the like enveloped in a wrapper comprising a corrugated paperboard sheet scored to define a top panel, a bottom panel, and side panels, said bottom panel having opposite end flaps extending for the full width thereof and foldably*

*connected thereto at parallel fold lines spaced apart a distance substantially greater than the maximum dimension of said article, each of said end flaps being divided by fold lines into first, second and third sub-panels, said last-mentioned fold lines being parallel with each other and parallel with said first-mentioned fold lines:*

*(1) the first sub-panels being immediately adjacent the first-mentioned fold lines, of a dimension perpendicular to said fold line which is substantially*

$$\frac{PL-AL}{2}$$

*where PL is the distance between said first-mentioned fold lines and AL is said maximum dimension of said article, and folded flat against said said bottom panel to provide a double thickness,*

*(2) the second sub-panel being foldably connected to the first sub-panel, of a dimension perpendicular to said fold lines which is substantially the same as the inside minor dimension of said side panels, and folded to extend in a direction perpendicular to the first sub-panel, and*

*(3) the third sub-panel being foldably connected to the second sub-panel and of substantially the same dimensions as the first sub-panel and folded flat against the top panel*

*and a glue flap integrally foldably connected to one of said panels, and adhered to another of said panels.*

*7. A package comprising, an article such as a book or the like enveloped in a wrapper comprising a corrugated paperboard sheet scored to define a top panel, a bottom panel, and side panels, said bottom panel having portions extending in opposite directions therefrom for the full width thereof and foldably connected thereto at parallel fold lines spaced apart a distance substantially greater than a major dimension of said article, each of said portions being divided by fold lines into first, second and third sub-panels, said last-mentioned fold lines being parallel with each other and parallel with said first-mentioned fold lines,*

*(1) the first sub-panels being immediately adjacent the first-mentioned fold lines, of a dimension perpendicular to said fold line which is substantially*

$$\frac{PL-AL}{2}$$

*where PL is the distance between said first-mentioned fold lines and AL is said major dimension of said article, and folded flat against said bottom panel to provide a double thickness,*

*(2) The second sub-panel being foldably connected to the first sub-panel, of a dimension perpendicular to said fold lines which is substantially the same as the inside minor dimension of said side panels, and folded to extend in a direction perpendicular to the first sub-panel, and*

*(3) the third sub-panel being foldably connected to the second sub-panel and of substantially the same dimensions as the first sub-panel and folded flat against the top panel,*

*said portions being so folded that said second sub-panel substantially closes the space between said top and bottom panels at a position which is inset from the margins of the package in the direction parallel with said major dimension of said article.*

*8. A package comprising, an article such as a book or the like enveloped in a wrapper comprising a corrugated paperboard sheet scored to define a top panel, a bottom panel, side panels and edge panels, said bottom panel having portions extending in opposite directions therefrom for the full width thereof and foldably connected thereto at parallel fold lines spaced apart a distance substantially greater than a major dimension of said article, each of said portions being divided by fold lines*

*into first, second and third sub-panels, said last-mentioned fold lines being parallel with each other and parallel with said first-mentioned fold lines in which:*

*(1) the first sub-panels being immediately adjacent the first-mentioned fold lines, of a dimension perpendicular to said fold line which is substantially*

$$\frac{PL-AL}{2}$$

*where PL is the distance between said first-mentioned fold lines and AL is said major dimension of said article, and folded flat against said bottom panel to provide a double thickness,*

*(2) the second sub-panel being foldably connected to the first sub-panel, of a dimension perpendicular to said fold lines which is substantially the same as the inside minor dimension of said side panels, and folded to extend in a direction perpendicular to the first sub-panel, and*

*(3) the third sub-panel being foldably connected to the second sub-panel and of substantially the same dimensions as the first sub-panel and folded flat against the top panel,*

*said portions being so folded that said second sub-panel substantially closes the space between said top and bottom panels at a position which is inset from the margins of the package in the direction parallel with said major dimension of said article; said edge panels each being foldably connected to another one of said panels.*

*9. A corner-protecting package for books and articles of like shape comprising a sheet of foldable board having bottom, side, top, side and glue panels foldably connected in that order to form an article-encompassing sleeve of length greater than the article, the width of the top and bottom panels being greater than that of the side panels,*

*the bottom panel having foldably connected marginal portions at each end folded back within the sleeve, the infolded bottom-panel margins including an end-wall section and retainer sections, said end-wall sections being folded at right angles to the bottom and top panels, and said retainer sections respectively being folded flat against the interior of the top and bottom panels to provide a double thickness, said retainer sections each having a dimension parallel with the length of said sleeve, which is approximately half the difference between the length of said article and the length of said sleeve, and said end-wall sections extending from adjacent one side wall to adjacent another side wall.*

References Cited by the Examiner

The following references, cited by the Examiner, are of record in the patented file of this patent or the original patent.

UNITED STATES PATENTS

| | | | |
|---|---|---|---|
| 283,065 | 8/83 | Block | 229—27.3 |
| 1,039,026 | 9/12 | Carter | 229—39 |
| 1,793,101 | 2/31 | Lambombode | 229—5.5 |
| 2,046,562 | 7/36 | Kan et al. | 206—46 |
| 2,114,134 | 4/38 | Weiss. | |
| 2,176,944 | 10/39 | Ringler | 229—5.5 |
| 2,514,384 | 7/50 | Frankenstein | 229—32 |
| 2,874,524 | 2/59 | Ringler | 53—29 |
| 2,919,060 | 12/59 | Daniels | 229—51 |
| 3,064,875 | 11/62 | Main | 229—40 |

FOREIGN PATENTS

| | | |
|---|---|---|
| 731,707 | 6/55 | Great Britain. |
| 58,091 | 8/46 | Netherlands. |

GEORGE O. RALSTON, *Primary Examiner.*

FRANKLIN T. GARRETT, *Examiner.*